US012785164B2

(12) United States Patent
Yamashita

(10) Patent No.: US 12,785,164 B2
(45) Date of Patent: Nov. 3, 2026

(54) METHOD FOR PRODUCING VALUABLE METAL

(71) Applicant: SUMITOMO METAL MINING CO., LTD., Tokyo (JP)

(72) Inventor: Yu Yamashita, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 495 days.

(21) Appl. No.: 18/567,380

(22) PCT Filed: Mar. 14, 2022

(86) PCT No.: PCT/JP2022/011395
§ 371 (c)(1),
(2) Date: Dec. 6, 2023

(87) PCT Pub. No.: WO2022/264569
PCT Pub. Date: Dec. 22, 2022

(65) Prior Publication Data

US 2025/0118820 A1 Apr. 10, 2025

(30) Foreign Application Priority Data

Jun. 15, 2021 (JP) ................................. 2021-099359

(51) Int. Cl.
*H01M 10/54* (2006.01)
*C22B 5/10* (2006.01)
(Continued)

(52) U.S. Cl.
CPC ............... *H01M 10/54* (2013.01); *C22B 5/10* (2013.01); *C22B 7/004* (2013.01); *C22B 23/02* (2013.01)

(58) Field of Classification Search
CPC .......... H01M 10/54; C22B 5/10; C22B 7/004; C22B 23/02; C22B 1/02; C22B 7/00;
(Continued)

(56) References Cited

U.S. PATENT DOCUMENTS

2014/0069234 A1* 3/2014 Takahashi ................ C22C 1/02 75/414
2014/0102256 A1 4/2014 Mori et al.
2017/0229744 A1 8/2017 Heulens et al.

FOREIGN PATENT DOCUMENTS

CN 103380220 A 10/2013
EP 1589121 A1 10/2005
(Continued)

OTHER PUBLICATIONS

Extended European Search Report issued Aug. 27, 2025 in the EP Patent Application No. 22822860.7.
Office Action issued Dec. 12, 2025 in the CN Patent Application No. 202280040849.4 and English translation thereof.

*Primary Examiner* — Adil A. Siddiqui
(74) *Attorney, Agent, or Firm* — Troutman Pepper Locke LLP

(57) ABSTRACT

The invention provides a method by which a valuable metal is recovered, in particular iron. A method for producing a valuable metal containing cobalt (Co), the method comprising: a preparation step in which a starting material that contains at least iron (Fe) and a valuable metal is prepared; a melting step in which a melt is obtained by heating and melting the starting material, and the melt is subsequently formed into a molten material that contains an alloy and slag; and a slag separation step in which the slag is separated from the molten material, thereby recovering the alloy containing the valuable metal. In the preparation step, the Fe/Co mass ratio in the starting material is controlled to 0.5 or less; and in the melting step, the Co content in the slag
(Continued)

that is obtained by heating and melting the starting material is set to 1% by mass or less.

6 Claims, 1 Drawing Sheet

(51) Int. Cl.
*C22B 7/00* (2006.01)
*C22B 23/02* (2006.01)

(58) Field of Classification Search
CPC ......... C22B 7/001; C22B 26/12; Y02P 10/20; Y02W 30/84
See application file for complete search history.

(56) References Cited

FOREIGN PATENT DOCUMENTS

| | | | |
|---|---|---|---|
| EP | 3269832 | A1 | 1/2018 |
| EP | 4180137 | A1 | 5/2023 |
| JP | 2012-057238 | A | 3/2012 |
| JP | 2012-224877 | A | 11/2012 |
| JP | 2012-251220 | A | 12/2012 |
| JP | 2013-091826 | A | 5/2013 |
| JP | 5853585 | B2 | 2/2016 |
| JP | 2017-526820 | A | 9/2017 |
| JP | 6542354 | B2 | 7/2019 |
| JP | 2021-031761 | A | 3/2021 |
| KR | 10-2007-0046990 | A | 5/2007 |
| WO | 2016/023778 | A1 | 2/2016 |

* cited by examiner

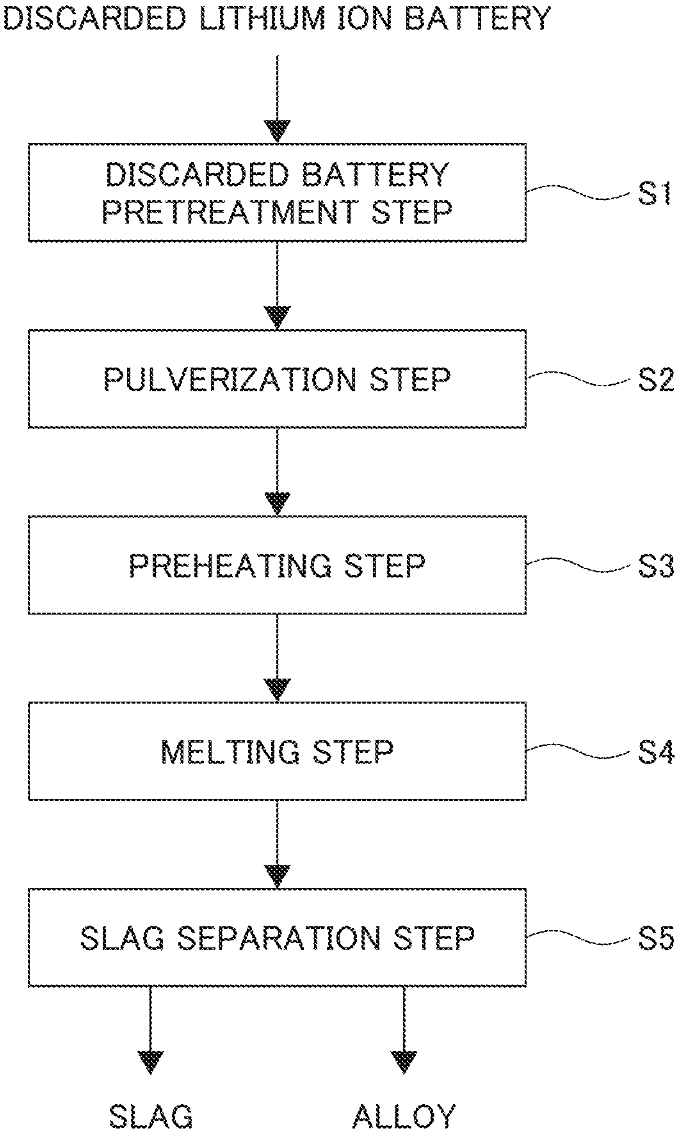
DISCARDED LITHIUM ION BATTERY
DISCARDED BATTERY PRETREATMENT STEP
S1
PULVERIZATION STEP
S2
PREHEATING STEP
S3
MELTING STEP
S4
SLAG SEPARATION STEP
S5
SLAG
ALLOY

METHOD FOR PRODUCING VALUABLE METAL

CROSS REFERENCE TO RELATED APPLICATIONS

This application is related to co-pending application: "METHOD OF PRODUCING VALUABLE METAL" filed even date herewith in the name of Yu YAMASHITA as a national phase entry of PCT/JP2022/011398, which application is assigned to the assignee of the present application and is incorporated by reference herein.

TECHNICAL FIELD

The present invention relates to a method for producing a valuable metal from a raw material such as a discarded lithium ion battery.

BACKGROUND ART

Recently, lithium ion batteries have become popular as secondary batteries which are light and have large output. A well-known lithium ion battery has a structure in which a negative electrode material, a positive electrode material, a separator, and an electrolytic solution are sealed in an outer can. Here, the outer can is made of a metal such as iron (Fe) or aluminum (Al). The negative electrode material is composed of a negative electrode active material (graphite or the like) fixed to a negative electrode current collector (copper foil or the like). The positive electrode material is composed of a positive active material (e.g., lithium nickelate or lithium cobaltate) fixed to a positive current collector (e.g., aluminum foil). The separator is composed of a porous resin film of polypropylene or the like. The electrolytic solution includes an electrolyte such as lithium hexafluorophosphate ($LiPF_6$).

One of the main applications of lithium ion batteries includes hybrid cars and electric vehicles. Therefore, it is expected that a large amount of mounted lithium ion batteries are likely to be discarded in the future according to the lifecycle of automobiles. Lithium ion batteries may also be discarded as defective products during production. There is a need to reuse such used batteries or defective batteries generated during production (hereinafter referred to as "discarded lithium ion batteries" or a "discarded lithium ion battery") as a resource.

As a recycling technique, a pyrometallurgical smelting process has been conventionally proposed, in which a whole amount of discarded lithium ion batteries is melted in a high-temperature furnace (a melting furnace). The pyrometallurgical smelting process is a method of subjecting pulverized discarded lithium ion batteries to melting treatment, and separating and recovering a valuable metal to be recovered, such as cobalt (Co), nickel (Ni), or copper (Cu), and a metal having a low added value, such as iron or aluminum, using a difference in oxygen affinity therebetween. In this method, a metal having a low added value is oxidized as much as possible to form a slag, whereas a valuable metal is recovered as an alloy by suppressing the oxidation as much as possible.

As described above, in the pyrometallurgical smelting process in which valuable metals are separated and recovered by utilizing the difference in oxygen affinity, it is very important to control a degree of oxidation-reduction during the melting treatment. That is, if the control of the degree of oxidation-reduction is insufficient, there arises a problem that impurities are mixed into an alloy to be recovered as a valuable metal, or an oxidized valuable metal is incorporated into a slag to be recovered as an impurity, and this lowers a recovery rate of the valuable metal. Therefore, in the pyrometallurgical smelting process, a degree of oxidation-reduction is conventionally controlled by introduction of an oxidant such as air or oxygen or a reductant into a melting furnace.

For example, with regard to a process for separating cobalt from lithium present in a charge including lithium ion batteries or battery scrap, Patent Document 1 discloses: that it is preferable to adjust oxygen input into a bath to set a target oxygen pressure to $10^{-18}$ to $10^{-14}$ atm; and that the upper limit ($10^{-14}$ atm) precludes formation of cobalt oxides in the slag and its loss and the lower limit ($10^{-18}$ atm) ensures that elements such as aluminum and carbon are oxidized (claim 1 and paragraph [0018], etc.).

Patent Document 2 discloses a method of recovering a valuable metal from a lithium ion discarded battery containing nickel and cobalt, in which strict adjustment of a degree of oxidization is possible by adjusting an amount of oxygen, an oxidation time, and a temperature in treatment in a preliminary oxidation step; that substantially the entire amount of aluminum oxide can be separated as a slag in a slag separation step by adjusting a degree of oxidation; that an additional oxidation treatment for a minute time can be performed in a melting step; and that an appropriate degree of oxidation can be finely adjusted by an additional oxidation step (claim 1 and paragraphs [0033] and [0036], etc.).

Patent Document 1: Japanese Patent No. 6542354

Patent Document 2: Japanese Patent No. 5853585

DISCLOSURE OF THE INVENTION

Problems to be Solved by the Invention

As described above, as a method of removing impurities in the recovery of valuable metals in the pyrometallurgical smelting process, it has been proposed to introduce air, oxygen, or the like during melting treatment to control the degree of oxidation-reduction, but an issue remains in terms of separation property between the valuable metal and the impurities. That is, it is necessary not only to control a degree of oxidation-reduction (oxygen partial pressure) by the treatment in the melting step but also to appropriately control a composition of a charge.

For example, a discarded lithium ion battery contains a large amount of impurities such as carbon (C), aluminum (Al), fluorine (F), phosphorus (P), and iron (Fe). Among them, iron has a property of being relatively easily reduced. Therefore, if a degree of reduction is increased too high for recovering a valuable metal, iron may be mixed into an alloy which is the original target of recovery as the valuable metal. On the other hand, if a degree of reduction is excessively low, iron can be oxidized and removed as a slag, but valuable metals, particularly cobalt, are oxidized, and cannot be recovered as alloys. As described above, it is difficult to completely separate iron and cobalt in the treatment in the melting step, and it was unavoidable to sacrifice either the quality of the alloy or the recovery rate of cobalt.

In the technology of Patent Document 1, although the recovery rate of cobalt is high due to a high degree of reduction, a large amount of iron also remains in the alloy. When an amount of iron brought into the treatment in the melting step is larger than that of cobalt, an attempt to increase a recovery rate of cobalt also increases an amount of iron remaining in the alloy, which necessitates a treatment for removing the iron in the subsequent step, which increases a treatment cost thereof. In the technology of Patent Document 2, a dephosphorylation step is further provided after the melting step and the slag separation step, to attempt to separate phosphorus from the alloy by the dephosphorylation step (claim 1 and paragraphs [0039] to [0046]). According to such a method, phosphorus can be removed, and iron can also be removed to some extent, but an amount of iron removed is not sufficient and a large amount of iron remains in the alloy. This necessitates a removal treatment in a subsequent step, which increases the cost.

The present invention has been made in view of the above circumstances, and an object of the present invention is to provide a method for effectively and efficiently separating impurities, particularly iron, contained in a raw material to be processed and for recovering valuable metals at a high recovery rate.

Means for Solving the Problems

The present inventors have intensively studied to solve the above-mentioned issues. As a result, the inventors have found that with regard to iron, which is easy to reduce next to cobalt (Co), if a mass ratio of Fe/Co in a charge, which is subjected to the treatment of a melting step so as to be treated, is limited and a cobalt grade in a slag obtained by a melting process is controlled, it is possible to decrease an iron content in the metal, while maintaining a high cobalt recovery rate, thereby arriving at completion of the present invention.

A first aspect of the present invention relates to a method for producing a valuable metal containing cobalt (Co), the method including: a preparation step of preparing a raw material containing at least iron (Fe) and a valuable metal; a melting step of heating and melting the raw material into a melt and then converting the melt into a molten product containing an alloy and a slag; and a separation step of separating the slag from the molten product to recover an alloy containing the valuable metal, in which, in the preparation step, a mass ratio of Fe/Co in the raw material is controlled to 0.5 or less, and in the melting step, a Co grade in the slag obtained by heating and melting the raw material is set to 1% by mass or less.

A second aspect of the present invention relates to the method for producing a valuable metal as described in the first aspect, in which an Fe grade in the alloy obtained by heating and melting the raw material is 5% by mass or less.

A third aspect of the present invention relates to the method for producing a valuable metal as described in the first or second aspect, in which the raw material includes a discarded lithium ion battery.

A fourth aspect of the present invention relates to the method for producing a valuable metal as described in the third aspect, in which the outer can used in the discarded lithium ion battery contains iron.

A fifth aspect of the present invention relates to the method for producing a valuable metal as described in any one of the first to fourth aspects, in which, in the melting step, the Co grade in the slag is adjusted by adding an oxidant and/or a reductant to the melt.

Effects of the Invention

According to the present invention, it is possible to provide a method in which impurities, particularly iron, contained in the raw material to be processed can be effectively and efficiently separated and a valuable metal can be recovered at a high recovery rate.

BRIEF DESCRIPTION OF THE DRAWINGS

FIG. 1 is a process diagram showing a flow of producing a valuable metal from a discarded lithium ion battery.

PREFERRED MODE FOR CARRYING OUT THE INVENTION

Hereinafter, a specific embodiment of the present invention (hereinafter referred to as "present embodiment") will be described. The present invention is not limited to the following embodiment, and various modifications can be made in a scope where the gist of the present invention is unchanged.

<<1. Process for Producing Valuable Metal>>

The method for producing a valuable metal according to the present embodiment is a method for separating and recovering a valuable metal from a raw material containing the valuable metal including cobalt (Co). Therefore, the present method can also be referred to as a recovery method of a valuable metal. The method according to the present embodiment is mainly composed of a pyrometallurgical smelting process but may be composed of a pyrometallurgical smelting process and a hydrometallurgical smelting process.

Specifically, the method according to the present embodiment includes the following steps; a preparation step of preparing a charge containing at least iron (Fe) and a valuable metal as a raw material, a melting step of heating and melting the prepared raw material to form a melt, then converting the melt into a molten product containing an alloy and a slag, and a slag separating step of separating a slag from the obtained molten product to recover an alloy containing the valuable metal. A feature of this method is that, in the preparation step, a mass ratio of Fe/Co in the raw material is limited and in the melting step, a Co grade in the slag obtained by heating and melting the raw material is controlled.

Here, the valuable metal is a target of recovery and contains at least cobalt (Co) as described above. More specifically, it is at least one type of metal or alloy selected from the group consisting of copper (Cu), nickel (Ni), cobalt (Co), and combinations thereof.

[Preparation Step]

In the preparation step, a charge containing a valuable metal is prepared as a raw material. The charge, which is a raw material, is a treatment target for recovering a valuable metal and contains valuable metals including cobalt (Co) in addition to containing at least iron (Fe) as an impurity. The charge may contain these components in the form of metals or elements or in the form of compounds such as oxides. The charge may contain inorganic and organic components other than these components.

In the method according to the present embodiment, the mass ratio (Fe/Co) of iron (Fe) to cobalt (Co) in the raw material is controlled within a specific range in the preparation step. Specifically, the mass ratio of Fe/Co in the raw material is controlled to 0.5 or less.

When the mass ratio of Fe/Co in the raw material is more than 0.5, it is difficult to separate cobalt and iron in the treatment in the melting step described later, rendering the iron grade of the alloy obtained by the melting treatment high. By limiting the mass ratio of Fe/Co in the preparation step, the iron grade in the resultant alloy can be decreased.

Specifically, a method of adjusting the mass ratio of Fe/Co in the raw material is not particularly limited, and the mass ratio can be adjusted, for example, by subjecting the raw material to a treatment such as pulverization and magnetic sorting to remove pieces containing iron.

The raw material is not particularly limited. Examples include discarded lithium ion batteries, electronic components including dielectric materials or magnetic materials, and electronic devices. Further, the form thereof is not limited as long as it is suitable for processing in subsequent steps. The raw material may be subjected to a treatment such as a pulverization treatment to prepare a suitable form. Further, the raw material may be subjected to a treatment such as heating treatment, sorting treatment, or the like to remove unnecessary components such as moisture or organic matter.

[Melting Step]

In the melting step, the prepared raw material (charge) is loaded into a melting furnace, heated and melted to form a melt, and then the melt is converted into a molten product containing an alloy (metal) and a slag.

The melt contains the alloy and the slag in a molten state. The molten product contains an alloy and a slag in a state where each of the alloy and the slag is in a molten state. The alloy mainly contains a valuable metal, and the slag contains other components such as impurity elements. Therefore, the valuable metal and the other components can be separated as an alloy and a slag, respectively. This is because a metal having a low added value (Al or the like) has a high oxygen affinity, whereas a valuable metal has a low oxygen affinity.

For example, aluminum (Al), lithium (Li), carbon (C), manganese (Mn), phosphorus (P), iron (Fe), cobalt (Co), nickel (Ni), and copper (Cu) are generally oxidized in the order of Al>Li>C>Mn>P>Fe>Co>Ni>Cu. That is, aluminum (Al) most easily oxidizes, while copper (Cu) least easily oxidizes. Therefore, a metal (Al or the like) having a low added value easily oxidizes and becomes a slag, and a valuable metal (Cu, Ni, Co) is reduced and becomes an alloy. In this way, a valuable metal and a metal having a low added value can be separated from each other in the form of an alloy and a slag.

Here, as can be understood from the description of the relationship of the oxygen affinity described above, iron (Fe) is relatively difficult to oxidize among impurity elements with a low added value. In other words, iron is easily reduced, and its property is approximated to cobalt (Co) which is a valuable metal. Therefore, in general control of oxidation-reduction in the melting step, it is difficult to sufficiently effectively separate iron and cobalt.

Therefore, in the method according to the present embodiment, as described above, the mass ratio of Fe/Co in the raw material is limited to 0.5 or less in the preparation step, and the raw material is subjected to treatment in the melting step. In the melting step, the Co grade in the slag obtained by the heating and melting treatment of the raw material is used as an index of a degree of reduction. Specifically, the degree of reduction is controlled such that the Co grade in the slag is 1% by mass or less. Thereby, Fe in the obtained alloy can be decreased while maintaining a high Co recovery rate, and as a result, efficient recovery of a valuable metal is possible.

The degree of reduction is controlled by sampling the obtained slag, analyzing the Co grade, and determining whether the Co grade is 1% by mass or less. For example, when the Co grade in a slag exceeds 1% by mass, the degree of reduction is controlled to increase, by adding a reductant. A method of checking the Co grade in the slag is not particularly limited, and examples thereof include a method of sampling the slag and pulverizing it and confirming the Co grade using an X-ray fluorescence analyzer. Further, the following method is possible: a relationship between a Co grade in the slag and an oxygen concentration in the melt is confirmed in advance, and the Co grade is confirmed by measuring an oxygen concentration in the melt using an oxygen sensor.

In the control of the degree of reduction using the Co grade in the slag as an index, a method of increasing the degree of reduction (shift to the reduction side) or a method of decreasing the degree of reduction (shift to the oxidation side) may be performed by a well-known method. For example, there is a method of introducing a reductant or an oxidant into a raw material to be subjected to the heating and melting treatment or the melt in which the raw material is melted. As the reductant, a material having high carbon grade (graphite powder, graphite particles, coal, coke, or the like), carbon monoxide, or the like can be used. Among the raw materials to be subjected to the heating and melting treatment, a component having a high carbon grade can also be used as a reductant. As the oxidant, an oxidizing gas (air, oxygen, or the like) or a material with a low carbon grade can be used. Among the raw materials subjected to the heating and melting treatment, a component having a low carbon grade can also be used as an oxidant.

Also, a method of introducing a reductant or an oxidant may be performed by a well-known method. For example, when the reductant or the oxidant is a solid substance, it may be charged into a raw material or a melt so as to be introduced. When the reductant or the oxidant is a gaseous substance, the reductant or the oxidant may be introduced by blowing it from an inlet port such as a lance provided in the melting furnace. Further, timing of introduction of the reductant or the oxidant is not particularly limited. For example, when the raw material to be subjected to the heating and melting treatment is introduced into the melting furnace, the reductant or the oxidant may also be introduced, or at a stage where the raw material is melted and has become a melt.

During the heating and melting treatment, a flux may be added to the raw material. By adding a flux, melting temperature can be lowered, and removal of phosphorus (P) as an impurity element can be further advanced. The flux preferably contains an element which incorporates an impurity element and forms a basic oxide having a low melting point. For example, phosphorus becomes an acidic oxide when oxidized, and thus, as the slag formed by heating and melting becomes basic, phosphorus is easily incorporated in the slag and is easily removed. Among them, those containing a calcium compound which is inexpensive and stable at room temperature are more preferable. Examples of the calcium compound include calcium oxide (CaO) and calcium carbonate ($CaCO_3$).

Heating temperature at the time of heating and melting the raw material is not particularly limited but is preferably 1300° C. or higher and 1600° C. or lower. By setting the heating temperature to 1300° C. or higher, valuable metals (for example, Cu, Co, and Ni) are sufficiently melted, and an alloy is formed in a state where fluidity is enhanced. This makes it possible to efficiently separate the alloy from the slag in a slag separation step described later. The heating temperature is more preferably set to 1350° C. or higher. On the other hand, if the heating temperature exceeds 1600° C., there is a possibility that thermal energy is wastefully consumed, and refractory materials such as crucibles and furnace walls consume too much, resulting in a decrease in productivity.

[Preheating Step]

If necessary, a preheating step of preheating (oxidative roasting) the raw material into a preheated product (oxidatively roasted product) may be provided before the melting step.

In the preheating step (oxidative roasting step), an amount of carbon contained in the raw material to be subjected to the melting step is decreased by preheating the raw material. By providing such a preheating step, even when the raw material to be subjected to the melting step contains excessive carbon, the carbon can be oxidatively removed efficiently, and alloy integration of the valuable metal can be promoted in the heating and melting treatment in the subsequent melting step.

More specifically, in the heating and melting treatment in the melting step, the valuable metal is reduced to locally molten fine particles, and at this time, carbon in the raw material may physically disturb the aggregation of the molten fine particles (valuable metal). If cohesive integration of the molten fine particles is prevented, the separation of the alloy and the slag to be generated may be prevented, and the recovery rate of the valuable metal may be decreased. On the other hand, by preheating the raw material in the preheating step prior to the heating and melting treatment to remove carbon, aggregation and integration of the molten fine particles can be efficiently advanced, and the recovery rate of the valuable metal can be further increased. Since phosphorus is an impurity element that is relatively easily reduced, if carbon exists excessively in the raw material, phosphorus may be reduced and taken into the alloy together with the valuable metal. Also in this respect, by removing excess carbon in the raw material in advance by preheating, it is possible to prevent phosphorus from entering the alloy.

Note that the carbon amount of the preheated product (oxidatively roasted product) obtained by preheating treatment is preferably less than 1% by mass.

Further, by providing the preheating step, variation in oxidation can be suppressed. In the preheating treatment in the preheating step, it is desired to perform the treatment (oxidative roasting) at a degree of oxidation capable of oxidizing a metal (Al or the like) having a low addition value contained in a raw material to be subjected to the melting step. On the other hand, the degree of oxidation can be easily controlled by adjusting the preheating treatment temperature, time, and/or atmosphere. Therefore, in the preheating treatment, the degree of oxidation can be adjusted more strictly, and variation in oxidation can be suppressed.

The degree of oxidation is adjusted as follows. As described above, aluminum (Al), lithium (Li), carbon (C), manganese (Mn), phosphorus (P), iron (Fe), cobalt (Co), nickel (Ni), and copper (Cu) are generally oxidized in the order of Al>Li>C>Mn>P>Fe>Co>Ni>Cu. In the preliminary heating step, when aluminum (Al) is contained in the raw material, oxidation is allowed to proceed until the entire amount of Al is oxidized. The oxidation may be performed until a part of iron (Fe) is oxidized, but it is preferable to keep the degree of oxidation to such an extent that cobalt (Co) is not oxidized and is not distributed to the slag.

The preheating treatment is preferably performed in the presence of an oxidant. Thereby, carbon (C) as an impurity element can be oxidatively removed efficiently. The oxidant is not particularly limited but is preferably an oxygen-containing gas (air, pure oxygen, oxygen-containing gas, etc.) from the viewpoint of easy handling. The amount of the oxidant to be introduced is preferably, for example, about 1.2 times the chemical equivalent required for oxidation of each substance to be oxidized.

The heating temperature of the preheating is preferably 700° C. or higher and 1100° C. or less. When the temperature is 700° C. or higher, the oxidation efficiency of carbon can be further increased, and the oxidation time can be shortened. When the temperature is 1100° C. or lower, the thermal energy cost can be suppressed, and the efficiency of preheating can be increased. The preheating temperature may be 800° C. or higher and 900° C. or lower.

The preheating treatment can be performed using a known roasting furnace. Further, it is preferable to use a furnace (preliminary furnace) different from the melting furnace, which is used in the treatment in the subsequent melting step, and to perform the preheating in the preliminary furnace. As the preliminary furnace, any type of furnace can be used as long as it is a furnace capable of supplying an oxidant (oxygen or the like) while roasting a raw material to be processed and performing oxidation treatment inside the furnace. Examples thereof include conventionally known rotary kilns and tunnel kilns (hearth furnaces).

[Slag Separation Step]

In the slag separation step, a slag is separated from the molten product obtained by heating and melting in the melting step, and an alloy containing a valuable metal is recovered. In the molten product, the alloy and the slag have different specific gravities. Therefore, the slag having a lower specific gravity than the alloy gathers in the upper portion of the alloy, and the slag can be easily separated and recovered by the specific gravity separation. Alternatively, the molten product containing the alloy and the slag may be discharged to a mold or the like and is allowed to separate and solidify into the alloy and the slag in the mold by the specific gravity difference between the alloy and the slag, and then the upper slag may be removed to recover the solidified alloy.

After the slag is separated in the slag separation step, a sulfurization step of sulfurizing the obtained alloy or a pulverization step of pulverizing the obtained sulfide or alloy may be provided. Further, the alloy of the valuable metal obtained through such a pyrometallurgical smelting process may be subjected to a hydrometallurgical smelting process. By the hydrometallurgical smelting process, it is possible to further remove impurity components, thereby separating and purifying valuable metals (for example, Cu, Ni, Co) and recovering them. Examples of the treatment in the hydrometallurgical smelting process include known methods such as neutralization treatment and solvent extraction treatment.

As described above, in the method for producing a valuable metal according to the present embodiment, the mass ratio of Fe/Co in the raw material to be subjected to the heating and melting treatment is limited in the preparation step, and the heating and melting treatment is performed by controlling the Co grade in the slag obtained in the melting step. According to this method, the Fe grade in the alloy (metal) can be decreased while maintaining a high cobalt recovery rate, and the valuable metal can be efficiently recovered. Specifically, for example, the Fe grade of the alloy can be 5 mass % or less while maintaining the cobalt recovery rate at 90% or more.

Here, the "cobalt recovery rate" is calculated by the following equation (1), using the contents of cobalt contained in the finally obtained alloy and slag.

[Formula 1]

$$\text{Cobalt recovery rate (\%)} = \frac{\text{Cobalt content in alloy}}{\text{cobalt content in alloy} + \text{cobalt content in slag}} \times 100 \quad (1)$$

In the method according to the present embodiment, the raw material (charge) is not particularly limited as long as it contains at least a valuable metal including cobalt (Co) but is preferably a raw material including a discarded lithium ion battery. A discarded lithium ion battery contains lithium (Li) and valuable metals (Cu, Ni, Co), and contains metals (Al, Fe, etc.) having low added values and carbon components. Therefore, by using a raw material including a discarded lithium ion battery, valuable metals can be efficiently separated and recovered. The phrase "discarded lithium ion battery" is a concept including not only used lithium ion batteries, but also defective products produced in the production process of positive electrode materials etc., which constitute batteries, residual materials during the production process, and waste materials, such as scrap, generated in the production process of lithium ion batteries. Therefore, the discarded lithium ion battery can also be referred to as a lithium ion battery waste material.

A method for producing a valuable metal from a discarded lithium ion battery will be described below.

<<2. Method for Producing Valuable Metal from Discarded Lithium Battery>>

FIG. 1 is a process diagram showing an example of a flow of the method for producing a valuable metal from a discarded lithium ion battery. As shown in FIG. 1, this method includes a step of removing an electrolytic solution and an outer can from a discarded lithium ion battery to obtain a content of the discarded battery (discarded battery pretreatment step S1), a step of pulverizing the content of the discarded battery to obtain a pulverized product (pulverization step S2), a step of preheating the pulverized product to obtain a preheated product (preheating step S3), a step of melting the preheated product to obtain a molten product (melting step S4), and a step of separating a slag from the molten product and recovering an alloy (slag separation step S5). Although not shown, after the slag separation step S5, a sulfurization step of sulfurizing the obtained alloy and a pulverization step (second pulverization step) of pulverizing the obtained sulfide or alloy may be provided.

A discarded lithium ion battery includes valuable metals such as nickel (Ni), cobalt (Co), and copper (Cu). The discarded lithium ion battery contains, for example, iron (Fe) as a constituent material of an outer can to be described later. By performing the treatments in the steps shown in FIG. 1, these valuable metals can be effectively recovered while separating impurity elements such as iron.

[Discarded Battery Pretreatment Step and Pulverization Step] (Discarded Battery Pretreatment Step)

The discarded battery pretreatment step (S1) is performed to prevent explosion of the discarded lithium ion battery, detoxify the same, and remove the outer can. Since the lithium ion battery is a closed system, it contains an electrolytic solution etc. inside. Therefore, if the battery is pulverized in its original state, it may explode, which is dangerous. It is preferable to perform discharge treatment or electrolytic solution removal treatment by using some kind of method.

Outer cans which constitute lithium ion batteries are often made of aluminum (Al) or iron (Fe), which are metals, and it is relatively easy to recover such metal outer cans as they are.

Thus, the electrolytic solution and outer can are removed in the discarded battery pretreatment step S1, whereby safety can be enhanced, and the recovery rate of valuable metals (Cu, Ni, and Co) can be increased.

The specific method of the discarded battery pretreatment is not particularly limited. For example, the electrolytic solution is removed by physically opening holes in the discarded lithium ion battery with a tip of a needle-like blade. Another method is to heat the discarded lithium ion battery and burn the electrolytic solution to detoxify it.

When aluminum or iron contained in the outer can is recovered in the discarded battery pretreatment step (S1), after pulverizing the outer can removed, a pulverized product thereof may be sieved using a sieve shaker. Aluminum can be efficiently recovered because it is easily pulverized to powder by light pulverization. Alternatively, iron contained in the outer can may be recovered by magnetic sorting.

(Pulverization Step)

In the pulverization step S2, the content of the discarded lithium ion battery is pulverized to obtain a pulverized product. This step is intended to enhance the reaction efficiency of the pyrometallurgical smelting process. The recovery rate of valuable metals (Cu, Ni, and Co) can be increased by enhancing the reaction efficiency.

The specific pulverization method is not particularly limited. The content of the discarded lithium ion battery can be pulverized using a conventionally known pulverizer, such as a cutter-mixer.

Here, the discarded battery pretreatment step S1 or the discarded battery pretreatment step S1 and the pulverization step S2 correspond to the preparation step described above. That is, the method according to the present embodiment is characterized in that the mass ratio (Fe/Co) of iron (Fe) to cobalt (Co) in the raw material is controlled to 0.5 or less. By limiting the mass ratio of Fe/Co in this manner, the iron grade in the alloy (metal) obtained through the heating and melting in the melting step S4 described later can be decreased.

[Preheating Step]

In the preheating step (oxidative roasting step) S3, the pulverized product obtained in the pulverization step S2 is preheated (oxidative roasting) to obtain a preheated product (oxidatively roasted product). The details of this step are as described above, and by performing preheating in the preheating step, even when the raw material to be subjected to the melting step S4 contains excessive carbon, the carbon can be oxidatively removed effectively, and the alloy integration of the valuable metal can be promoted in the heating and melting treatment.

[Melting Step]

In the melting step S4, the preheated product obtained in the preheating step S3 is melted to obtain a molten product. The details of this step are as described above.

In particular, the feature of the method according to the present embodiment is that a raw material having an Fe/Co mass ratio of 0.5 or less is loaded into a melting furnace to be subjected to heating and melting treatment, and a degree of reduction is controlled by using a Co grade in the slag obtained by the heating and melting treatment as an index of the degree of reduction, specifically, such that the Co grade in the slag is 1% by mass or less. Thereby, Fe in the obtained alloy can be decreased while maintaining a high Co recovery rate, and as a result, efficient recovery of a valuable metal is possible.

[Slag Separation Step]

In the slag separation step S5, the slag is separated from the molten product obtained in the melting step S4, and the alloy (metal) is recovered. The details of this step are as described above, and the metal and the slag can be easily separated and recovered by a specific gravity difference therebetween.

As described above, a sulfurization step or a pulverization step may be provided after the slag separation step S5. Further, each of the valuable metals may be separated and purified by performing a hydrometallurgical smelting process on the recovered alloy containing each valuable metal.

EXAMPLES

Hereinafter, Examples of the present invention will be described in more detail, but the present invention is not limited to the following Examples.

(1) Production of Valuable Metal

A discarded lithium ion battery was used as a raw material (a charge) and the following steps were sequentially performed to produce a valuable metal.

[Discarded Battery Pretreatment Step and Pulverization Step (Preparation Step)]

Used batteries and defective products collected in the battery production process were prepared as discarded lithium ion batteries. The discarded lithium ion batteries were collectively immersed in salt water to discharge, and the moisture was then removed, followed by roasting in the air at 260° C. to remove electrolytic solutions and outer cans, thereby obtaining a battery content.

The obtained battery content was pulverized with a pulverizer (trade name: Good Cutter, produced by Ujiie Manufacturing Co., Ltd.) to obtain a pulverized product. Iron was removed from the obtained pulverized product by a sieve and a magnet, and the mass ratio of Fe/Co in the raw material was adjusted to each predetermined value shown in the following Table 1.

[Preheating Step]

The obtained pulverized product was loaded into a rotary kiln and preheated at 800° C. for 180 minutes in the atmosphere to obtain a preheated product (a raw material for the heating and melting treatment).

[Melting Step]

To the preheated pulverized product (raw material for the heating and melting treatment), calcium oxide (CaO) was added as flux, and graphite powder was further added as a reductant, followed by mixing. The obtained mixture was placed into a 1 L-alumina crucible, and this was heated and melted at a temperature of 1400° C. by resistance heating to form a melt. Thereafter, a molten product containing a molten alloy and a slag was obtained.

During heating and melting, the produced slag was sampled and the Co grade was analyzed. When the Co grade exceeded 1% by mass, an operation of controlling the degree of reduction by adding a reductant was performed to adjust the Co grade in the slag to 1% by mass or less.

[Slag Separation Step]

The slag was separated from the obtained molten product using the specific gravity difference, and the alloy (metal) was recovered.

(2) Evaluation

The recovered alloy (metal) was subjected to elemental analysis using an ICP analyzer (Agilent 5100 SUDV, manufactured by Agilent Technologies). Elements of the analysis target were nickel (Ni), cobalt (Co), and copper (Cu), which are valuable metals, and iron (Fe), which is an impurity difficult to remove from the metal. The content (mass %) of iron in the alloy was defined as the iron grade (Fe grade).

The recovery rate of cobalt was determined as follows. That is, the cobalt contents in the alloy and the slag determined by the elemental analysis were calculated according to the following equation (1).

[Formula 1]

$$\text{Cobalt recovery rate (\%)} = \frac{\text{Cobalt content in alloy}}{\text{cobalt content in alloy} + \text{cobalt content in slag}} \times 100 \quad (1)$$

(3) Results

Table 1 below shows the result of Fe grades and Co recovery rates in the alloys.

TABLE 1

| | Fe/Co in raw material (mass ratio) | Raw material weight (kg) | CaO (flux) (kg) | Carbon powder (kg) | Co grade in slag (mass %) | Co grade in alloy (mass %) | Co recovery rate (%) | Fe grade in alloy (mass %) |
|---|---|---|---|---|---|---|---|---|
| Example 1 | 0.10 | 1.35 | 0.15 | 0.034 | 0.08 | 15 | 99.5 | 1.3 |
| Example 2 | 0.30 | 1.36 | 0.17 | 0.031 | 0.42 | 15 | 97.3 | 2.4 |
| Example 3 | 0.30 | 1.36 | 0.17 | 0.030 | 0.52 | 15 | 96.6 | 2.3 |
| Example 4 | 0.30 | 1.36 | 0.17 | 0.030 | 0.46 | 15 | 97.0 | 2.3 |
| Example 5 | 0.50 | 1.33 | 0.16 | 0.029 | 0.78 | 15 | 55.1 | 3.6 |
| Example 6 | 0.30 | 0.93 | 0.16 | 0.030 | 0.46 | 31 | 97.1 | 4.8 |
| Example 7 | 0.50 | 0.99 | 0.13 | 0.028 | 0.21 | 7 | 97.1 | 1.8 |
| Comparative Example 1 | 0.75 | 1.30 | 0.16 | 0.033 | 0.48 | 16 | 97.0 | 6.0 |
| Comparative Example 2 | 0.75 | 1.24 | 0.14 | 0.023 | 1.84 | 15 | 39.0 | 3.1 |
| Comparative Example 3 | 0.30 | 1.19 | 0.14 | 0.023 | 1.84 | 15 | 89.0 | 1.3 |

As can be seen from the results of Table 1, in each of Examples 1 to 7, the Co recovery rate was 90% or more and the Fe grade in the alloy was 5% by mass or less, and it was possible to achieve both a high Co recovery rate and a decrease in Fe grade in the alloy.

On the other hand, in Comparative Example 1, the Co recovery rate was high, but the Fe grade in the alloy was higher than 5% by mass. This is considered as follows: since Fe/Co in the raw material was high, Fe was also reduced when the degree of reduction was increased to increase the Co recovery rate, and as a result, the Fe grade in the alloy became high. Further, in Comparative Examples 2 and 3, although the Fe grade in the alloy was decreased, the Co recovery rate was lower than 90%. In Comparative Example 2, since Fe/Co in the raw material was high, when the degree of reduction was lowered to decrease the Fe grade in the alloy, the reduction of Co did not sufficiently proceed and as a result, the recovery rate of Co is considered to have decreased. Also in Comparative Example 3, it is considered that when the degree of reduction was lowered to decrease the Fe grade in the alloy, the reduction of Co did not sufficiently proceed, and as a result, the recovery rate of Co decreased.

The invention claimed is:

1. A method for producing a valuable metal comprising cobalt (Co), the method comprising the following steps:

a preparation step of preparing a raw material comprising at least iron (Fe) and a valuable metal;

a melting step of heating and melting the raw material into a melt and then converting the melt into a molten product comprising an alloy and a slag; and a separation step of separating the slag from the molten product to recover an alloy comprising the valuable metal, wherein, in the preparation step, a mass ratio of Fe/Co in the raw material is controlled to 0.5 or less, and in the melting step, a Co grade in the slag obtained by heating and melting the raw material is set to 1% by mass or less, and an Fe grade in the alloy obtained is set to 5 mass % or less.

2. The method for producing a valuable metal according to claim 1, wherein the raw material comprises a discarded lithium ion battery.

3. The method for producing a valuable metal according to claim 2, wherein, in the melting step, the Co grade in the slag is adjusted by adding an oxidant and/or a reductant to the melt.

4. The method for producing a valuable metal according to claim 2, wherein the outer can used in the discarded lithium ion battery comprises iron.

5. The method for producing a valuable metal according to claim 4, wherein, in the melting step, the Co grade in the slag is adjusted by adding an oxidant and/or a reductant to the melt.

6. The method for producing a valuable metal according to claim 1, wherein, in the melting step, the Co grade in the slag is adjusted by adding an oxidant and/or a reductant to the melt.

* * * * *